(12) United States Patent
Kosinski

(10) Patent No.: US 7,954,876 B2
(45) Date of Patent: Jun. 7, 2011

(54) TENSIONER AND FASTENING DEVICE FOR A TONNEAU COVER

(75) Inventor: David Kosinski, Northville, MI (US)

(73) Assignee: Rugged Liner, Owosso, MI (US)

( * ) Notice: Subject to any disclaimer, the term of this patent is extended or adjusted under 35 U.S.C. 154(b) by 0 days.

(21) Appl. No.: 12/629,514

(22) Filed: Dec. 2, 2009

(65) Prior Publication Data

US 2010/0133872 A1  Jun. 3, 2010

Related U.S. Application Data

(60) Provisional application No. 61/119,185, filed on Dec. 2, 2008.

(51) Int. Cl.
*B60J 11/00* (2006.01)
(52) U.S. Cl. ............... 296/98; 296/100.17; 296/100.18; 296/136.1; 296/136.12
(58) Field of Classification Search ............ 296/100.01, 296/100.03, 100.04, 100.16, 100.17, 100.18, 296/98, 136.01, 136.04, 136.1, 136.12; 24/662, 24/682.1, 575.1, 108, 681
See application file for complete search history.

(56) References Cited

U.S. PATENT DOCUMENTS

| | | | |
|---|---|---|---|
| 3,213,507 A | 10/1965 | Christian et al. | |
| 3,482,343 A | 12/1969 | Hamu | |
| 3,910,155 A | 10/1975 | Wilson | |
| 3,949,500 A | 4/1976 | Connors | |
| 3,965,952 A | 6/1976 | Rivman et al. | |
| 4,301,853 A | 11/1981 | Vidal | |
| 4,305,171 A * | 12/1981 | Pettersson | ............ 24/662 |
| 4,639,033 A | 1/1987 | Wheatley et al. | |
| 5,007,146 A | 4/1991 | Meidan | |
| 5,058,652 A | 10/1991 | Wheatley et al. | |
| 5,121,960 A | 6/1992 | Wheatley | |
| 5,251,951 A | 10/1993 | Wheatley | |
| 5,271,171 A | 12/1993 | Smith | |
| 5,365,994 A | 11/1994 | Wheatley et al. | |
| 5,487,585 A | 1/1996 | Wheatley | |
| 5,522,635 A | 6/1996 | Downey | |
| 5,595,417 A | 1/1997 | Thoman et al. | |
| 5,636,893 A | 6/1997 | Wheatley et al. | |
| 5,655,808 A | 8/1997 | Wheatley | |
| 5,758,922 A | 6/1998 | Wheatley | |
| 5,772,273 A | 6/1998 | Wheatley | |
| 5,788,315 A | 8/1998 | Tucker | |
| 5,797,643 A * | 8/1998 | Demedash | ............ 296/100.16 |
| 5,906,407 A | 5/1999 | Schmeichel | |
| 5,934,735 A | 8/1999 | Wheatley | |
| 5,984,400 A | 11/1999 | Miller et al. | |
| 6,024,401 A | 2/2000 | Wheatley et al. | |
| 6,024,402 A | 2/2000 | Wheatley | |

(Continued)

*Primary Examiner* — Lori L Lyjak
(74) *Attorney, Agent, or Firm* — Howard & Howard Attorneys PLLC

(57) ABSTRACT

A protective cover assembly for covering a space. The assembly includes a frame having rails. A material is disposed over the frame for covering the space. A plurality of fastening devices are disposed through to the material for securing the material to each of the rails. An anchor is secured to the second rail. A plunger extends from either the anchor or the first rail and defines an operational axis. The plunger slidably engages the other of either the first rail or the anchor for guiding the first rail between a first position relaxing the material and a second position tightening the material. The fastening device includes a cap, fingers and a retaining member engaging the fingers for capturing the material between the cap and the retaining member.

22 Claims, 9 Drawing Sheets

U.S. PATENT DOCUMENTS

| | | |
|---|---|---|
| 6,053,558 A | 4/2000 | Weldy et al. |
| 6,123,492 A | 9/2000 | Pickard |
| 6,149,220 A | 11/2000 | Weldy et al. |
| 6,257,306 B1 | 7/2001 | Weldy |
| 6,293,608 B1 | 9/2001 | Dicke et al. |
| 6,386,616 B1 | 5/2002 | Wheatley |
| 6,439,640 B1 | 8/2002 | Wheatley |
| 6,499,791 B2 | 12/2002 | Wheatley |
| 6,511,117 B1 | 1/2003 | Henning |
| 6,543,836 B1 | 4/2003 | Wheatley |
| 6,568,740 B1 | 5/2003 | Dimmer |
| 6,575,520 B1 | 6/2003 | Spencer |
| 6,619,719 B1 | 9/2003 | Wheatley |
| 6,719,353 B1 | 4/2004 | Isler et al. |
| 6,752,449 B1 | 6/2004 | Wheatley |
| 6,808,220 B2 | 10/2004 | Wheatley |
| 6,808,221 B2 | 10/2004 | Wheatley |
| 6,811,203 B2 | 11/2004 | Wheatley |
| 6,814,388 B2 | 11/2004 | Wheatley |
| 6,814,389 B2 | 11/2004 | Wheatley |
| 6,824,191 B2 | 11/2004 | Wheatley |
| 6,893,073 B2 | 5/2005 | Wheatley |
| 6,976,724 B2 | 12/2005 | Wheatley |
| 7,025,403 B2 | 4/2006 | Wheatley |
| 7,204,540 B2 | 4/2007 | Wheatley |
| 7,427,095 B2 | 9/2008 | Wheatley |
| 7,445,264 B2 | 11/2008 | Spencer et al. |
| 7,452,024 B2 | 11/2008 | Landrith et al. |
| 7,472,941 B2 | 1/2009 | Schmeichel et al. |
| 7,484,790 B2 | 2/2009 | Wheatley |
| 7,607,714 B2 | 10/2009 | Wheatley |
| 2004/0164585 A1 | 8/2004 | Wheatley |
| 2005/0231000 A1 | 10/2005 | Wheatley |
| 2006/0006690 A1 | 1/2006 | Wheatley |
| 2006/0049659 A1 | 3/2006 | Wheatley |
| 2007/0024079 A1 | 2/2007 | Wheatley |
| 2007/0205629 A1 | 9/2007 | Wheatley |
| 2008/0036234 A1 | 2/2008 | Yokoyama et al. |
| 2008/0106114 A1 | 5/2008 | Wheatley |

* cited by examiner

TENSIONER AND FASTENING DEVICE FOR A TONNEAU COVER

RELATED APPLICATION

This application claims the benefit of U.S. Provisional Patent Application No. 61/119,185, filed on Dec. 2, 2008.

FIELD OF THE INVENTION

The present invention generally relates to a protective cover for covering a space, and more specifically, to a system for securing and tightening the protective cover.

BACKGROUND

Protective cover assemblies having a frame and a material covering the frame are well known for protecting spaces such as boats, wagons, trailers, as well as the cargo area of a pick-up truck. The frame typically includes a plurality of rails disposed about the perimeter of the space for supporting the material. A variety of methods to secure and tighten the material over the space have been employed over the years.

In the past, the protective cover was attached directly to the walls defining the space. Although effective, this method is not preferred due to the fact that a plurality of holes needed to be drilled into the walls defining the space to attach one side of a snap assembly. The holes cause permanent disfigurement to the appearance of the walls defining the space. The holes invite an opportunity for corrosion thus causing further deterioration to the appearance and functionality of the walls. Additionally, there was no adjustment available to account for dimensional changes in the material due to wear or temperature.

In recent years, improvements have been made in an attempt to improve the fit of protective covers to accommodate dimensional variations of the material due to environmental changes including the use of frames having tensioning devices and the use of various methods of attaching material to the frames. An example of such improvement is disclosed in U.S. Pat. No. 6,293,608 to Dicke et al. (the '608 patent).

The '608 patent discloses a protective cover assembly including a front rail and a rear rail spaced from the front rail and further including a pair of side rails spaced from each other and substantially perpendicular to the front and rear rails. A plurality of corner pieces couple the rails together. A pair of self-adjusting devices interconnect the rear rail to the side rails. Each of the self-adjusting devices include a stop coupled to the side rails, a biasing device disposed between the stop and the corner piece, and an interconnecting plate fixedly coupled to the side rail and slidably coupled to the corner piece for accommodating relative movement between the rear rail and the side rails.

Although the prior art protective covers teach various methods of accommodating dimensional changes in the material, there remains an opportunity for a tensioner having a simple design using few parts and not requiring adjustment.

SUMMARY OF THE INVENTION AND ADVANTAGES

The present invention provides a protective cover assembly for covering a space. The assembly comprising a frame including a first rail and a second rail adjacent and coupled to the first rail. A material is disposed over the frame for covering the space. A plurality of fastening devices are coupled to the material for securing the material to each of the first and said second rails. An anchor is fixedly secured to the second rail. A plunger extends from either the anchor or the first rail and defines an operational axis. The plunger slidably engages the other of either the first rail or the anchor for guiding the first rail between a first position relaxing the material and a second position tightening the material.

The present invention also provides a fastening device for use with a material. The fastening device includes a cap with a plurality of fingers mounted thereon. A plurality of detents are disposed on the fingers and spaced from the cap. A retaining member selectively engages the fingers for capturing the material between the cap and the retaining member to removably secure the fingers through the material.

Accordingly, the present invention provides a tensioner that automatically tightens the material of a protective cover assembly as the material dimensionally changes due age and/or environmental variations without the need to adjust the tensioner. Additionally, the present invention provides fastening devices for securing the material to the frame of the protective cover assembly that can be quickly and easily replaced when the fastening devices become damaged or worn.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
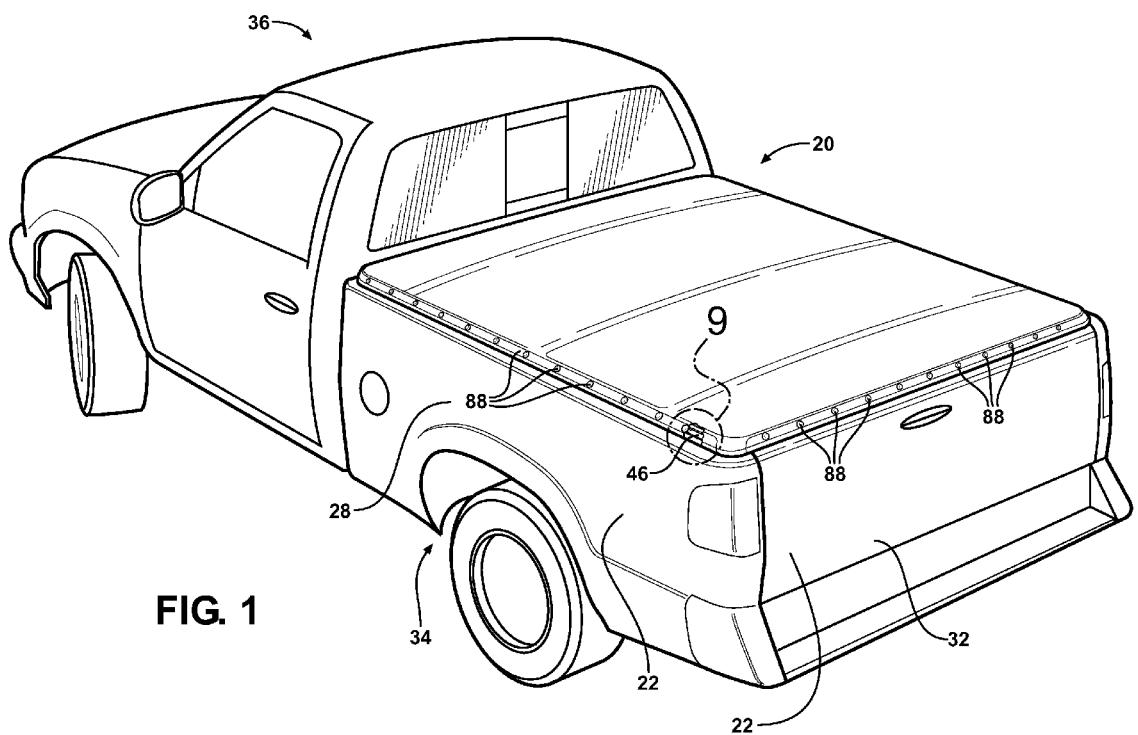
FIG. 1 is a perspective view of a pick-up truck with a protective cover covering a cargo area.
Figure 2:
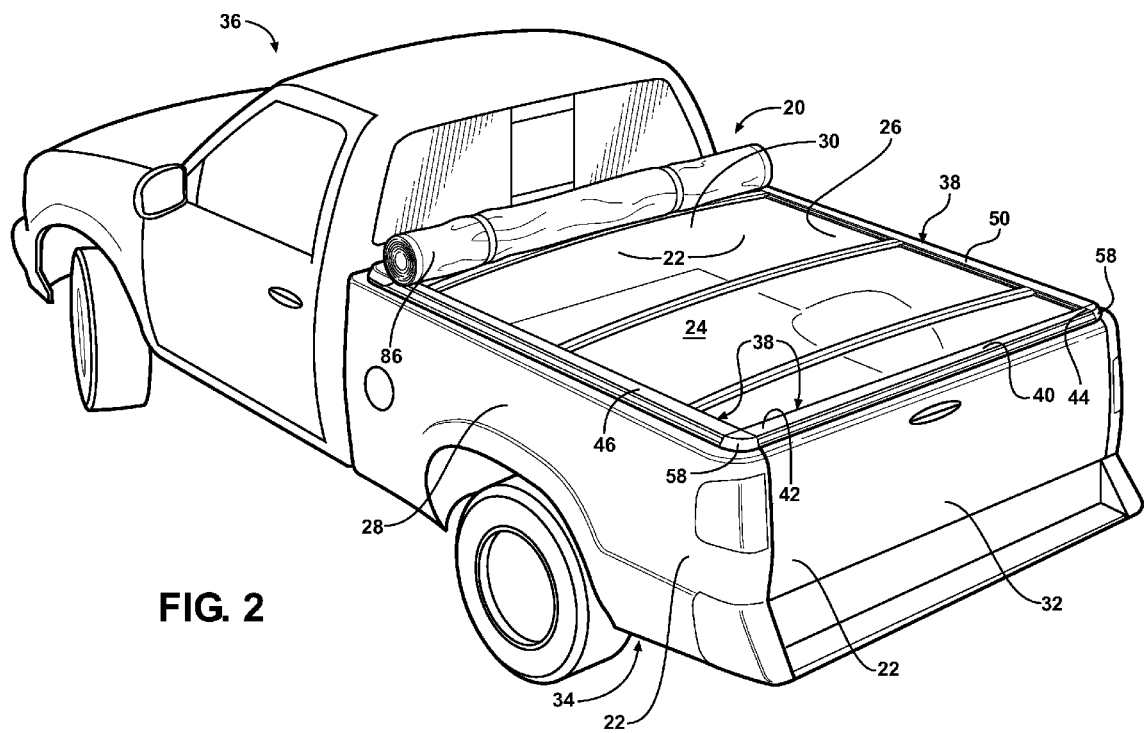
FIG. 2 is a perspective view of the pick-up truck with the protective cover rolled and exposing the cargo area.

Referring to the Figures wherein like numerals indicate like or corresponding parts throughout the several views, a protective cover is generally shown at 20. Referring to FIGS. 1 and 2, the protective cover 20 is adapted to couple to a plurality of walls 22 defining a space 24. The walls 22 are defined as a right side wall 26 and a left side wall 28 spaced from and substantially parallel to the right side wall 26. The walls 22 are further defined as a front wall 30 and a rear wall 32 spaced from and substantially parallel to the front wall 30.

Typically the front wall 30 and the rear wall 32 are substantially perpendicular to the right side wall 26 and the left side wall 28. As illustrated, the space 24 is a cargo bed 34 of a pick-up truck 36 such that the rear wall 32 is a tailgate, however the subject invention is not limited to such an application.

As best shown in FIG. 2, the protective cover 20 includes a frame 38 disposed on the walls 22 defining the space 24. The frame 38 includes a first rail 40 having a first end 42 and a second end 44. A second rail 46 is coupled to the first end 42 of the first rail 40 and is substantially perpendicular thereto. A third rail 50 is spaced from and substantially parallel to the second rail 46. The third rail 50 is substantially perpendicular to the first rail 40 and coupled to the second end 44 of the first rail 40. In the most preferred embodiment, the frame 38 comprises a light-weight metallic material, such as aluminum, and the first rail 40 and the second rail 46 are minor images of each other. A front rail (not shown) is coupled to the second 46 and third 50 rails opposite the first rail 40. It should be appreciated that the rails may be in any suitable orientation so long as the frame 38 defines a configuration complementary in shape to the space 24.

Figure 3:
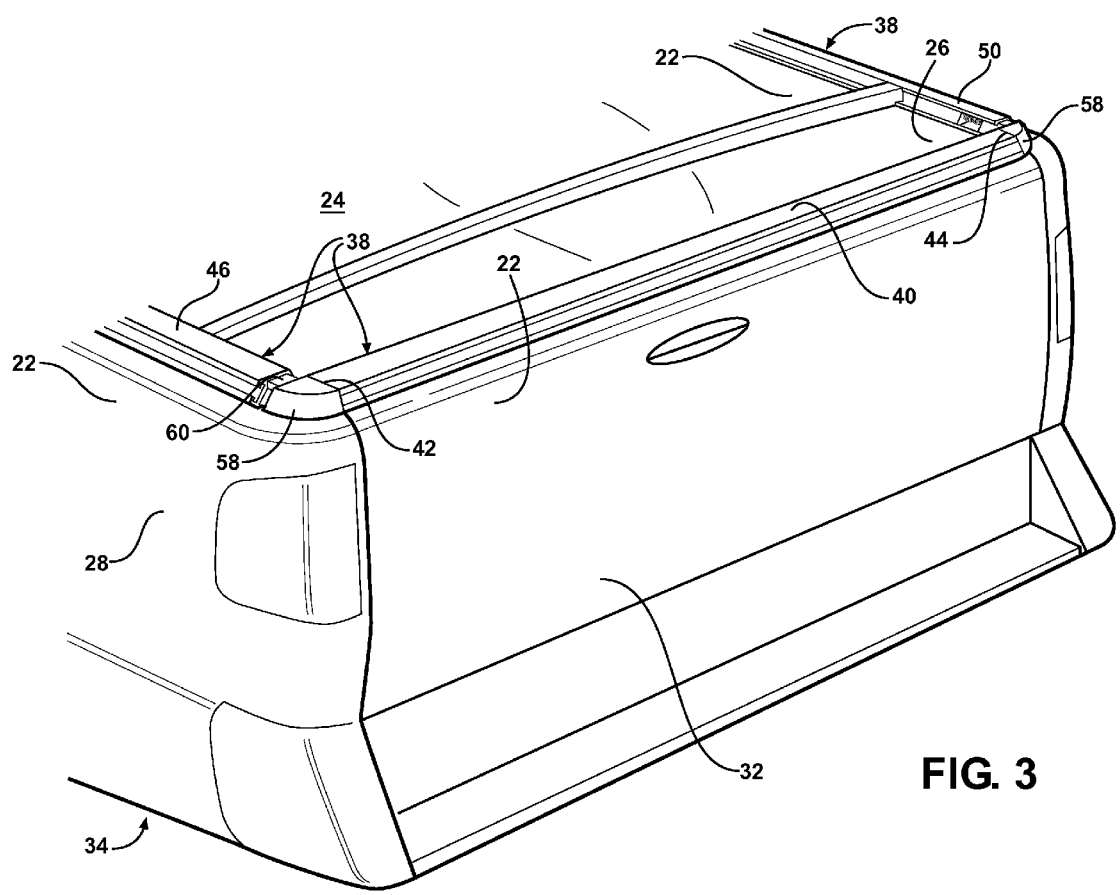
FIG. 3 is an enlarged perspective view of a rear end of the pick-up truck illustrating a first rail in a second position with the first rail biased away from second and third rails.
Figure 4:
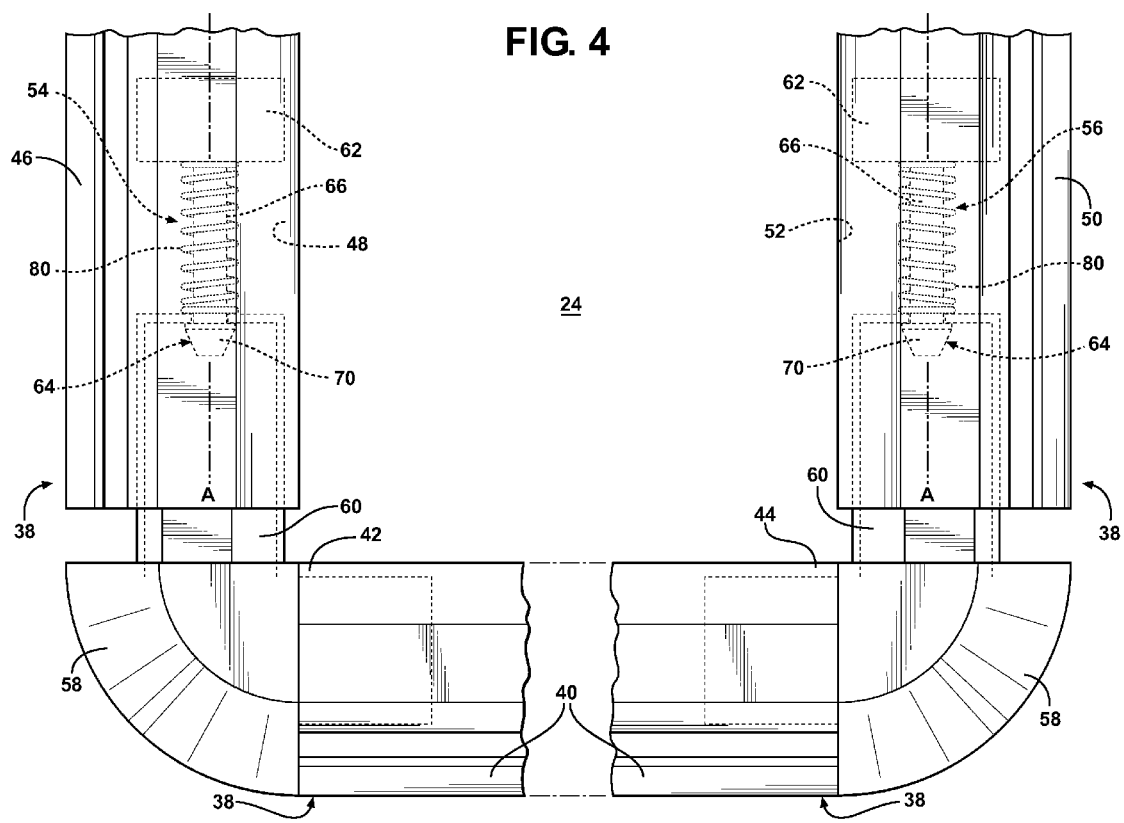
FIG. 4 is a fragmented planar top view illustrating a pair of tensioners in the second position biasing the first rail away from the second and third rails.

Referring now to FIGS. 3 and 4, a pair of tensioners are disposed within the frame 38 for coupling the first rail 40 to the second 46 and third 50 rails and for guiding the first rail 40 between a first position and a second position. More specifically, a first tensioner 54 couples the first rail 40 to the second rail 46 and a second tensioner 56 couples the first rail 40 to the third rail 50. In the preferred embodiment, the first 54 and second 56 tensioners are mirror images of one another and include substantially similar components. Therefore, in the interest of brevity the first 54 and second 56 tensioners will be described together in greater detail, will include common reference numerals, and will be subsequently referred to as the tensioner 54, 56.

Figure 5:
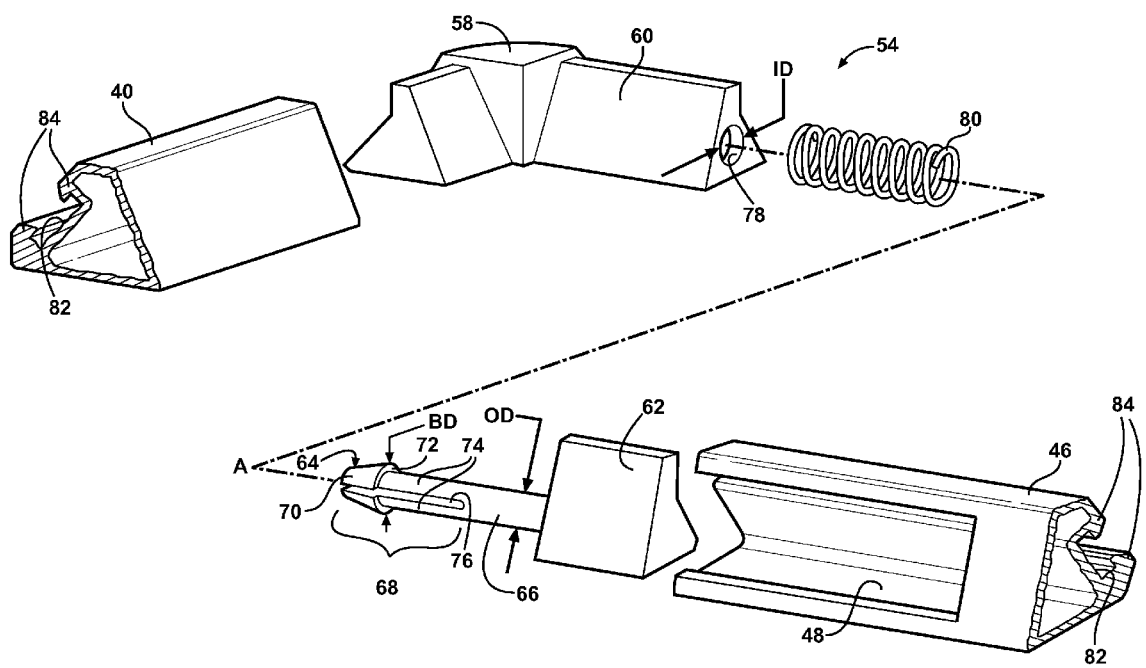
FIG. 5 is an exploded perspective view of a primary embodiment of the tensioner.

Referring also to FIG. 5, the tensioner 54, 56 includes a corner member 58 coupled to the first rail 40. The corner member 58 may be integrally formed with the first rail 40 or the corner member 58 may be a separate component. The corner member 58 includes a leg 60 extending away from and substantially perpendicular to the first rail 40. The second rail 46 includes an inner channel 48 with the leg 60 selectively engaging the inner channel 48 of the second rail 46. The leg 60 preferably has a configuration complementary to the inner channel 48 such that the leg 60 is constrained to translational movement within the inner channel 48 and restricts traverse movement thereby reducing lash.

The tensioner 54, 56 further includes an anchor 62 defining a configuration complementary in shape to the inner channel 48 of the second rail 46. The anchor 62 is fixedly secured within the inner channel 48.

Figure 6:
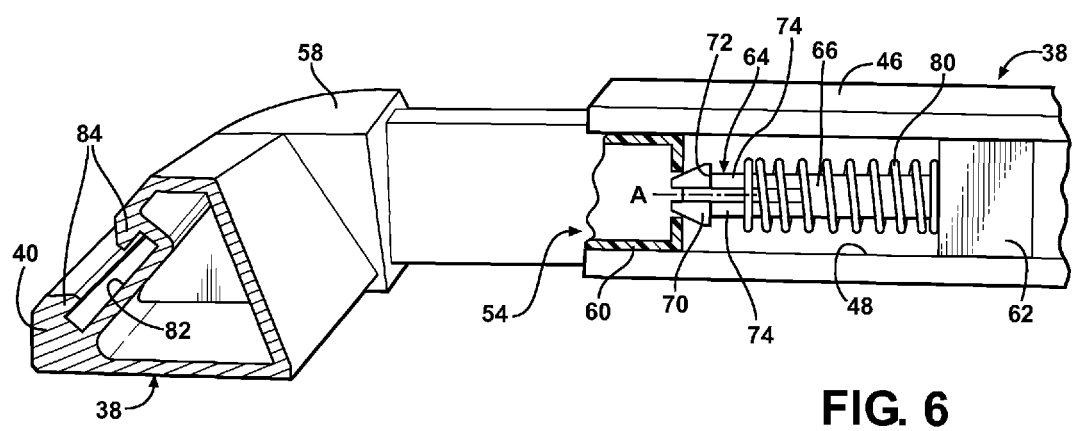
FIG. 6 is a partially cross-sectional side view of the tensioner with a plunger disengaged from a receiving orifice.
Figure 7:
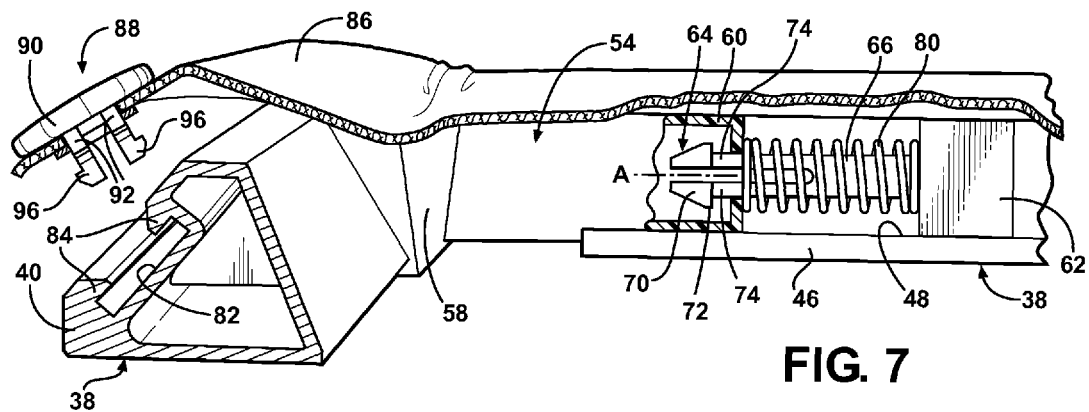
FIG. 7 is a partially cross-sectional side view of the tensioner in a first position releasing the material.
Figure 8:
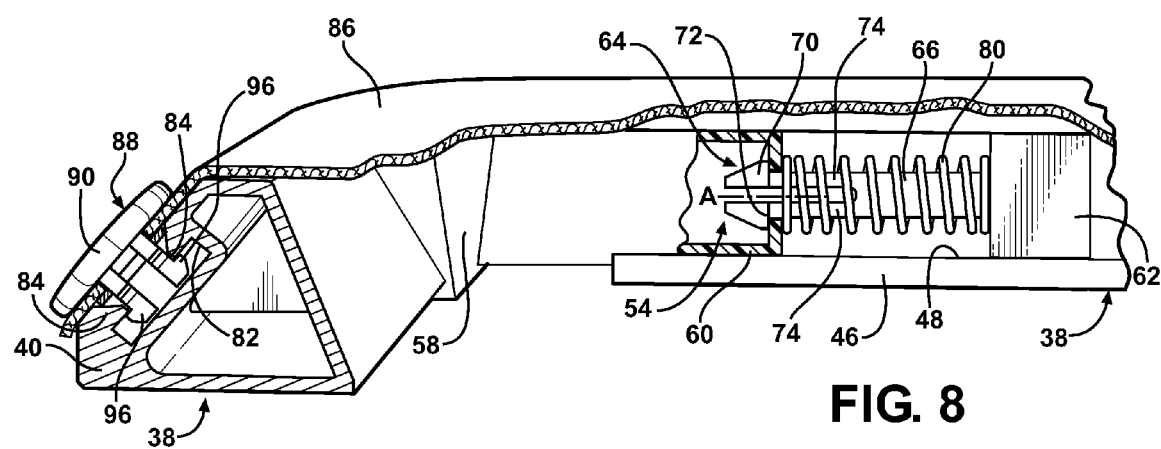
FIG. 8 is a partially cross-sectional side view of the tensioner in a second position tightening the material.

Referring additionally to FIGS. 6-8, in a primary embodiment a plunger 64 is mounted to and extends from the anchor 62 and defines an operational axis A. Preferably the plunger 64 is integrally formed with the anchor 62 and comprises a polymeric material. The plunger 64 includes a shaft 66 defining an outer diameter OD. The shaft 66 has a retaining portion 68 along the operational axis A opposite the anchor 62. A head 70 is disposed on the retaining portion 68 and defines a tapered configuration including a base 72. The base 72 defines a base diameter BD greater than the outer diameter OD of the shaft 66. The retaining portion 68 further includes a pair of arms 74 spaced from one another defining a slot 76 therebetween. The corner member 58 defines a receiving orifice 78 having an inner diameter ID for slidably accepting the plunger 64. The inner diameter ID is greater than the outer diameter OD of the shaft 66 and less than the base diameter BD of the head 70. The slot 76 allows the arms 74 to flex inwardly toward each other when the plunger 64 engages the corner member 58 allowing the head 70 to pass through the receiving orifice 78 thereby selectively securing the plunger 64 there in. The plunger 64 may be removed by flexing the arms 74 toward each other and allowing the base 72 of the head 70 to bypass the receiving orifice 78. When the plunger 64 is removed from the receiving orifice 78, the first rail 40 may be detached from the second 46 and third 50 rails and stored away for allowing full access to the space.

A biasing member 80 is disposed about the plunger 64 for continuously biasing the first 40 and second 44 rails away from one another. In the primary embodiment the biasing member 80 is a coil spring. However it should be appreciated that any suitable biasing member may be used without deviating from the subject invention.

Turning to FIGS. 1-3 and 5-10, the frame 38 also defines an outer channel 82 opposite the inner channel 48. The outer channel 82 is bounded by a pair of flanges 84. A material 86 is disposed over and secured to the frame 38 for covering the space 24. The material 86 may be of any suitable design and is preferably a type of water resistant canvas.

Figure 9:
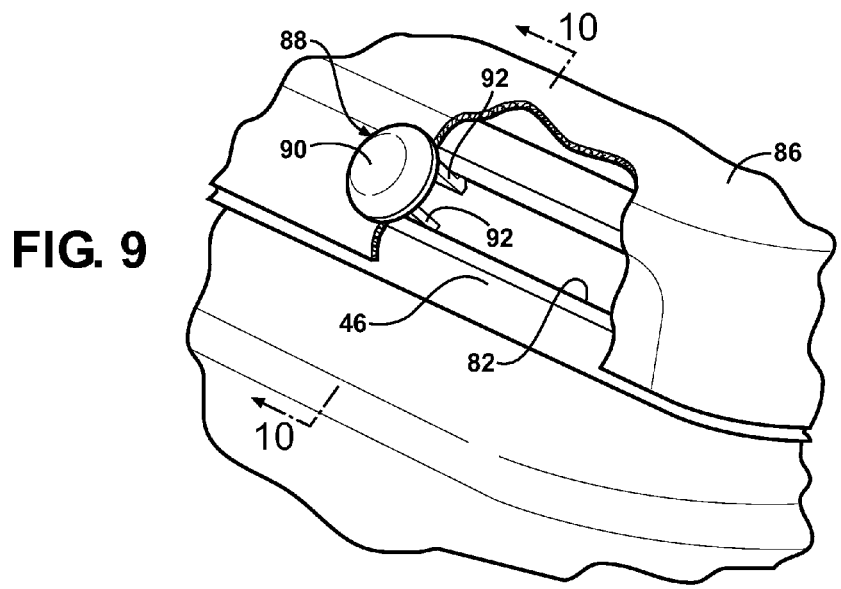
FIG. 9 is a perspective view of a fastening device engaged in an outer channel of a rail.
Figure 10:
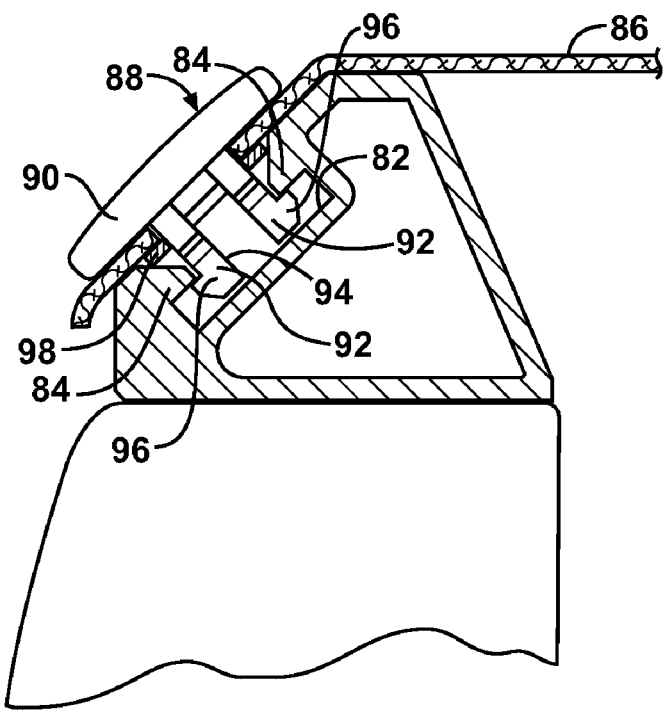
FIG. 10 is a partially cross-sectional side view of the fastening device engaged in the outer channel of the rail taken along line 10-10 from FIG. 9.
Figure 11:
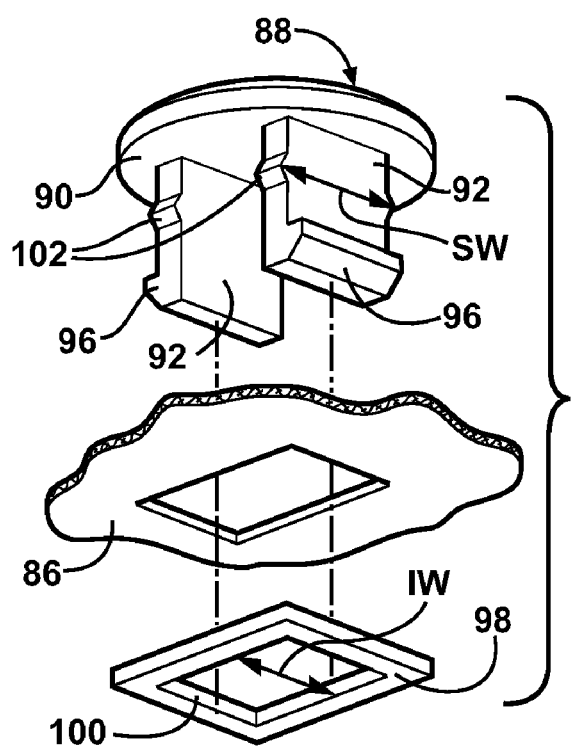
FIG. 11 is an exploded view of the fastening device.

A plurality of fastening devices 88 are disposed through the material 86 for securing the material 86 to the outer channel 82 of the frame 38. Referring now to FIGS. 9-11, each of the fastening devices 88 includes a cap 90. A pair of fingers 92 extend from and are substantially perpendicular to the cap 90. The fingers 92 are spaced from one another and define a gap 94 therebetween. Each of the fingers 92 include a detent 96 extending away from the gap 94 and disposed on the fingers 92 opposite the cap 90. The detent 96 may be integrally formed with the fingers 92. The gap 94 allows the fingers 92 to flex toward one another when engaging the frame 38 for allowing the detent 96 to bypass the flanges 84 bounding the outer channel 82. The detent 96 engages the flanges 84 for selectively securing the fastening devices 88 within the outer channel 82.

The fastening devices 88 further include a retaining member 98. The retaining member 98 has a hollow configuration and presents an interior surface 100 defining an inner width IW. Each of the fingers 92 further include a pair of projections 102 extending beyond each of the fingers 92 in opposite directions from one another spaced from the cap 90. The projections 102 define a second width SW greater than the inner width IW of the retaining member 98. When the fingers 92 are extending through the material 86, the retaining member 98 is forced over the projections 102 for securing the material 86 between the cap 90 and the retaining member 98.

To remove the fastening devices 88 from the material 86, the retaining member 98 is urged over the projections 102 and away from the cap 90 and off of the fingers 92. The cap 90 and the fingers 92 can then be removed from the material 86, which is typically done during repair or servicing of the material 86 and/or fastening devices 88.

For illustrative purposes only, a discussion of the operation of the protective cover 20 from an unsecured position to a secured position will be described below. The material 86 is initially unrolled over the frame 38 with the fastening devices 88 disposed through the material 86. The material 86 is then secured to the first 42, second 46, and third 50 rails with the fastening devices 88. Each of the fastening devices 88 are urged into the outer channel 82 causing the fingers 92 to flex inwardly toward each other for allowing the detent 92 on each of the fingers to bypass the flanges 84 on the outer channel 82. The fingers 92 return to a position substantially perpendicular to the cap and each detent 96 selectively engages one of the flanges 84 and secures the fastening device within the inner channel.

The first rail 40 is mounted to the second 46 and third 50 rails (if not already installed) by aligning each corner member 58 on the first 42 and second 44 ends of the first rail 40 with the inner 48 and interior 52 channels respectively and engaging each plunger 64 into the corresponding receiving orifice 78. The first rail 40 is then pushed forward toward the front rail forcing each plunger 64 deeper into the corresponding receiving orifice 78 and collapsing the biasing member 80 between the corner member 58 and the anchor 62 as the first rail 40 moves into the first position as shown in FIG. 7. In this embodiment, the corner member 58 defines each receiving orifice 78 and the plunger 64 is fixedly mounted on the anchor 62, therefore the receiving orifice 78 moves relative to the plunger 64. When in the first position, the overall frame 38 is shortened for allowing the material 86 to be easily attached to the first rail 40. With the first rail 40 in the first position, each of the fastening devices 88 are urged into the outer channel 82 (as described above) of the first rail 40 securing the material 86 thereto. The first rail 40 is then released and each biasing member 80 forces the first rail 40 rearward away from the second 46 and third 50 rails automatically tightening the material 86. Each biasing member 80 continuously biases the first rail 40 rearward to keep the material 86 taut regardless of any dimensional changes in the material 86 due to temperature or age.

Figure 12:
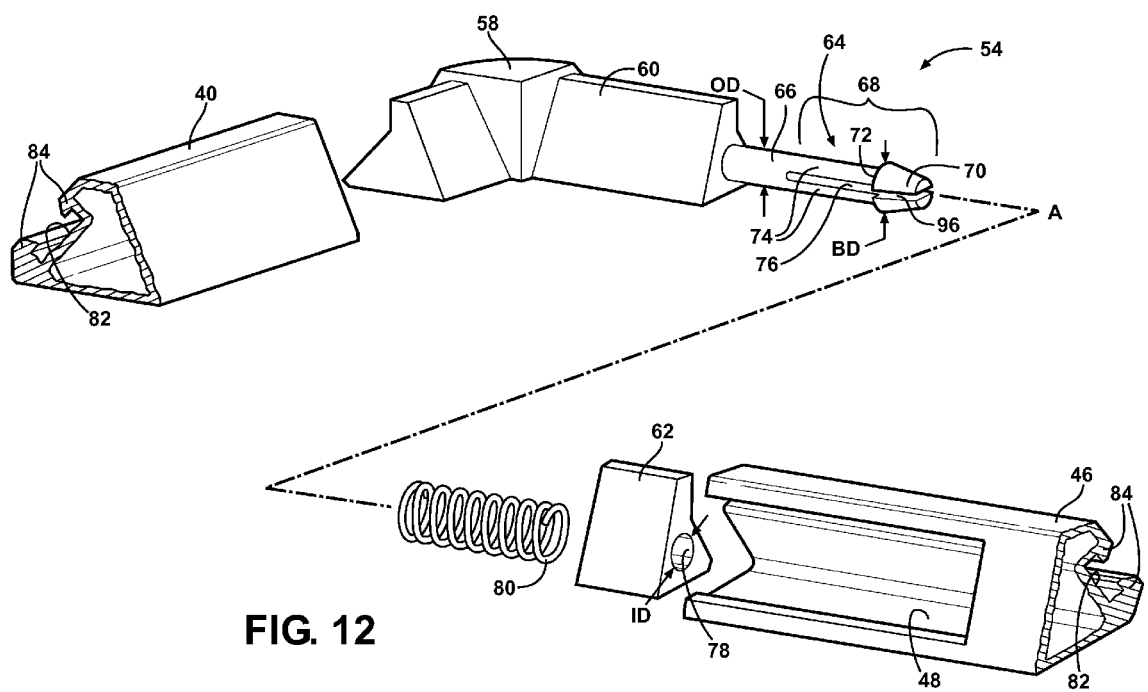
FIG. 12 is an exploded perspective view of an alternative embodiment of a tensioner.

In an alternative embodiment as shown in FIG. 12, the components are substantially similar to the primary embodiment described above. However, the plunger 64 is mounted on the leg 60 of the corner member 58. Additionally, the anchor 62 defines the receiving orifice 78 for slidingly accepting the plunger 64. When the plunger 64 is engaged within the receiving orifice 78, the operation is substantially similar to the primary embodiment described above. In particular, in this embodiment, the anchor 62 defines each receiving orifice 78 and the plunger 64 is mounted on the corner member 58, therefore the plunger 64 moves relative to the receiving orifice 78.

The present invention has been described in an illustrative manner, and it is to be understood that the terminology which as been used in intended to be in the nature of words of description rather than of limitation. Obviously, many modifications and variations of the present invention are possible in light of the above teachings. The invention may be practiced otherwise than as specifically described within the scope of the appended claims.

What is claimed is:

1. A protective cover assembly for covering a space, said assembly comprising:
    a frame including a first rail and a second rail adjacent and coupled to said first rail;
    a material disposed over said frame for covering the space;
    a plurality of fastening devices coupled to said material for securing said material to each of said first rail and said second rail;
    an anchor fixedly secured to said second rail; and
    a plunger defining an operational axis and extending from one of said anchor and said first rail and slidably engaging the other of said first rail and said anchor for guiding said first rail between a first position relaxing said material and a second position tightening said material.

2. The assembly as set forth in claim 1 wherein said one of said anchor and said first rail defines a receiving orifice along said operational axis for slidably accepting said plunger.

3. The assembly as set forth in claim 1 further including a biasing member disposed about said plunger for continuously biasing said first and second rails away from one another.

4. The assembly as set forth in claim 2 wherein said plunger includes a retaining portion extending beyond said receiving orifice to prevent withdrawal of said plunger from said receiving orifice while allowing said first rail to move between said first position and said second position.

5. The assembly as set forth in claim 4 wherein said plunger includes a shaft having an outer diameter and said retaining portion includes a head mounted on said shaft with said head having a base diameter greater than said outer diameter.

6. The assembly as set forth in claim 5 wherein said receiving orifice defines an inner diameter greater than said outer diameter of said shaft but less than said base diameter of said head for selectively securing said plunger within said receiving orifice.

7. The assembly as set forth in claim 4 wherein said retaining portion of said plunger includes a pair of arms spaced from one another to define a slot therebetween for allowing said arms to flex when engaging said receiving orifice.

8. The assembly as set forth in claim 1 wherein said second rail defines an inner channel and further including a corner member coupling said first rail to said second rail with said corner member having a leg configured to slide within said inner channel of said second rail.

9. The assembly as set forth in claim 8 wherein said anchor is mounted within said inner channel and said plunger is mounted on said anchor with said corner member defining a receiving orifice for accepting said plunger.

10. The assembly as set forth in claim 8 wherein said anchor is mounted within said inner channel and said plunger is mounted on said corner member with said anchor defining a receiving orifice for accepting said plunger.

11. The assembly as set forth in claim 1 wherein:
    said frame further includes a third rail spaced from and substantially parallel to said second rail;
    said anchor is further defined as a first anchor and further including a second anchor fixedly secured to said third rail;
    said plunger is further defined as a first plunger and further including a second plunger defining a second operational axis extending from one of said second anchor and said first rail and slidably engaging the other of said first rail and said second anchor for guiding said first rail between a first position relaxing said material and a second position tightening said material.

12. The assembly as set forth in claim 11 wherein said first rail includes a first end and a second end spaced from said first end with a first corner member coupled to said first end and a second corner member coupled to said second end of said first rail.

13. The assembly as set forth in claim 12 wherein said first and second plungers are mounted on said first and second anchors, respectively, and said first and second corner members each define a receiving orifice for accepting said first and second plungers.

14. The assembly as set forth in claim 12 wherein said first and second plungers are mounted on said first and second corner members, respectively, and said first and second anchors each define a receiving orifice for accepting said first and second plungers.

15. A protective cover assembly for covering a space, said assembly comprising:
    a plurality of frame members coupled to each other and each defining an outer channel;
    a material disposed over said frame members;

a plurality of fasteners each including a cap and a pair of fingers extending from said cap and selectively disposed through said material for selective engagement with said outer channel; and a retaining member selectively engaging said fingers for capturing said material between said cap and said retaining member to removably secure said fasteners to said material.

16. The assembly as set forth in claim 15 wherein said frame further includes a pair of flanges spaced from each other and bounding said outer channel, and each of said first and second fingers further include a detent extending outwardly away from each other for selectively engaging said flanges securing said fasteners within said outer channel of said frame member.

17. The assembly as set forth in claim 16 wherein said fingers define a gap therebetween for allowing said first and second fingers to flex inwardly toward each other when engaging said flanges of said frame.

18. The assembly as set forth in claim 15 wherein said retaining member is hollow and presents an interior surface defining an inner width with said fingers extending through said retaining member.

19. The assembly as set forth in claim 18 wherein each of said fingers include at least one projection extending beyond said finger and defining a second width greater than said inner width of said retaining member for supporting said retaining member between said cap and said projection.

20. A fastening device for use with a material, said fastening device comprising:

a cap;

a plurality of fingers mounted on said cap;

a plurality of detents disposed on said fingers and spaced from said cap; and a retaining member selectively engaging said fingers for capturing the material between said cap and said retaining member to removably secure said fingers through the material, wherein said retaining member is hollow and presents an interior surface defining an inner width with said fingers extending through said retaining member.

21. The device as set forth in claim 20 wherein said fingers define a gap therebetween for allowing said fingers to flex inwardly toward each other.

22. The device as set forth in claim 20 wherein each of said fingers include at least one projection extending beyond said finger and defining a second width greater than said inner width of said retaining member for supporting said retaining member between said cap and said projection.

* * * * *